United States Patent Office 3,354,137
Patented Nov. 21, 1967

3,354,137
PROCESS FOR ISOLATING ACETYLENE
POLYMERS FROM SCRUBBING OILS
Alexander Ohorodnik, Liblar, and Günter Legutke, Bruhl, near Cologne, Germany, assignors to Knapsack Aktiengesellschaft, a corporation of Germany
No Drawing. Filed Dec. 1, 1964, Ser. No. 415,171
Claims priority, application Germany, Dec. 4, 1963, K 51,532
9 Claims. (Cl. 260—94.1)

The present invention is concerned with a process for isolating acetylene polymers from scrubbing oils of the type used, for example, in the production of monovinylacetylene from an acetylene-containing gas mixture.

It is known that monovinylacetylene can be produced by introducing acetylene into an aqueous cuprous chloride solution in hydrochloric acid, but this procedure does not permit complete supression of side reactions which involve trimerization of acetylene and the formation of higher acetylenes and acetylene polymers.

British Patent 842,969 describes a process for making monovinylacetylene from a gas mixture containing acetylene and higher acetylenes by means of a combined two-stage scrubbing operation, wherein, in the first stage, the gas mixture is subjected to oil scrubbing to be separated into monovinylacetylene, divinylacetylene, chloroprene and higher-boiling acetylene polymers on the one hand, and into unreacted acetylene on the other hand. Material collecting in the sump phase of the oil scrubbing stage, in which the gas mixture components and a small proportion of acetylene are dissolved, is heated to first expel the monovinylacetylene, and then introduced into a second purifying stage to successively isolate divinylacetylene and chloroprene by injecting an inert gas. After such treatment, the scrubbing oil retained will contain merely higher boiling acetylene polymers. Since the scrubbing oil is cycled, i.e. continuously refluxed into the scrubbing process, the high-boiling acetylene polymers will concentrate and due to their partially solid consistency will block the apparatus used for carrying out the process.

In order to avoid such process breaks, it is suggested in the above patent, that a portion of contaminated scrubbing oil be continuously removed from the scrubbing oil cycle and replaced with fresh oil. This appears to be a patentably useful and economic processing step provided that the contaminated scrubbing oil portion withdrawn can be freed in any manner from the higher boiling acetylene and thereafter refluxed again into the scrubbing process. Practical experience has shown however that the scrubbing oil can only be freed from acetylene polymers by normal distillation as long as the contaminants appear therein in low concentration. Again, the proportion of scrubbing oil that can be distilled off is limited, and removal thereof must be arrested as soon as the concentration of the acetylene polymers in the scrubbing oil is critical. High-boiling acetylene polymers are known to constitute thermally unstable compounds which decompose at higher temperatures in explosion-like manner, and precautionary measures have therefore to be taken in the old process for preparing the scrubbing oil. The oil residue enriched with polymers and obtained after partial removal of scrubbing oil by distillation therefore was rejected or destroyed heretofore.

The present invention now provides a process which enables scrubbing oil contaminated with acetylene polymers to be regenerated by isolating the contaminants therefrom, and the regenerated scrubbing oil to be used again for scrubbing. This regenerating method as applied to the process of British Patent No. 842,969 adds to the economy of this process and eliminates the risk involved therewith.

The process of the present invention for isolating acetylene polymers from scrubbing oils, especially from scrubbing oils of the type obtained in the process of British Patent No. 842,969 comprises more especially allowing scrubbing oil enriched with acetylene polymers to flow downwardly in the form of a liquid film over a heated surface area under reduced pressure at a temperature of at most about 150° C. allowing the scrubbing oil to evaporate at that temperature, and quenching unevaporated acetylene polymers immediately after having been passed over the said heated surface area, at a temperature below their decomposition point.

The contaminated scrubbing oils of the type obtained in the process of British Patent 842,969 which consists of aromatic hydrocarbons having a boiling range of about 185° to 220° C., are especially applicable to the regeneration method disclosed in the present invention. The acetylene polymers present as contaminants in the scrubbing oil include high-boiling, thermally unstable acetylene derivatives having a boiling point of at least 220° C.

An advantageous mode of executing the process of the present invention comprises evaporating the scrubbing oil contaminated with acetylene polymers in either a heated packed column or in a thin layer evaporator at a temperature of about 100° to 150° C. under a pressure of about 30 to 100 mm. mercury, and spontaneously quenching any residue not evaporated and coming from the evaporation means at a temperature below about 80° C. so as to prevent the residue from undergoing decomposition.

With a packed column, the hot scrubbing oil is allowed to trickle through the hot packing material, the evaporating oil is removed overhead and condensed, and unevaporated matter collecting in the bottom portion of the packed column is immediately quenched by being caused to flow over a cooled surface area.

In a manner analogous to that described for a packed column, the scrubbing oil can be regenerated in a thin layer evaporator, where the scrubbing oil is applied in the form of a thin layer onto a hot rotary cylinder and evaporated thereon within a short time. Unevaporated matter adhering to the cylinder surface area is continuously removed and quenched in a cooled draining groove at a temperature below 80° C. The packing material and the cylinder of the thin layer evaporator, respectively, are maintained at a surface temperature of about 100° to 140° C., whereas the cooled surface area over which the acetylene polymers are caused to travel is maintained at a maximum temperature of 40° C.

The process of the present invention thus enables scrubbing oil contaminated with acetylene polymers to be regenerated in harmless manner without any decomposition of the thermally unstable contaminants. The present teachings as applied to the process of British Patent 842,969 substantially add to the economy of this conventional method, which has already been described above and wherein monovinylacetylene can now be purified continuously in the first processing stage with a constant amount of scrubbing oil.

As opposed to this conventional method, the present process for isolating acetylene polymers from scrubbing oils comprises more especially allowing scrubbing oil enriched with acetylene polymers to trickle downwardly in the form of a liquid film over a heated surface area under reduced pressure at a temperature of at most about 150° C., allowing the scrubbing oil to evaporate at that temperature, and quenching unevaporated acetylene polymers immediately after having been passed over the said heated surface area at a temperature below their decompostiion point. Especially the high-boiling acetylene polymers can be isolated in this manner from contaminated scrubbing oils of the type obtained in the process of British Patent 842,969. These hydrocarbon scrubbing oils are isolated by being subjected to thin layer evaporation and the acetylene polymers not evaporated are continuously withdrawn from the heating zone to be successively quenched. Scrubbing oil consisting of aromatic hydrocarbons having a boiling range of about 170° to 230° C. can thus be freed from higher-boiling acetylene polymers. The acetylene polymers to be isolated generally have a boiling point of at least 200° C.

The following examples illustrate the invention:

EXAMPLE 1

*(Comparative example)*

250 grams of an aromatic scrubbing oil (boiling range: 170° to 230° C.) containing about 25% by weight acetylene polymer were distilled in conventional manner in a distilling means under reduced pressure of 30 to 50 mm. mercury at a head temperature of about 80 to 90° C. and at a still temperature of 100° to 130° C. Once half of the scrubbing oil had been distilled off, the acetylene polymers retained in the residue underwent spontaneous decomposition. With relatively large amounts of acetylene polymers, violent or explosion-like decomposition was observed.

EXAMPLE 2

800–1000 cc./hr. of the scrubbing oil defined in Example 1 were introduced into the upper portion of a heated packed column 50 cm. long and 5 cm. wide, and the scrubbing oil was distilled at a temperature of 100°–125° C. under a pressure of 30–60 mm. mercury. Not evaporated acetylene polymers were removed in the bottom portion of the column and quenched at a temperature of 70°–80° C. by being caused to travel over a cooled surface area. The contaminated scrubbing oil used could be recovered substantially quantitatively without the acetylene polymers being decomposed.

EXAMPLE 3

A thin layer evaporator of conventional design, 60 cm. long, 5 cm. wide and provided with a cooled drain board about 10 cm. wide, was charged, per hour, with 15 to 25 liters of the scrubbing oil described in Example 1, and the scrubbing oil was evaporated at a temperature of 100°–125° C. under a pressure of 30–40 mm. mercury. The portion of the scrubbing oil not evaporated was quenched on passing over the thin layer evaporator drain board which has been cooled at a temperature of 30° C., the distillation residue assuming a temperature of 75° C.

Decomposition of the distillation residue did not occur. The condensed scrubbing oil was free from contaminants and could be used again.

What is claimed is:

1. A process for isolating acetylene polymers from scrubbing oils, which comprises allowing a liquid film of a scrubbing oil enriched with acetylene polymers to flow downwardly over a heated surface area under reduced pressure at a temperature not exceeding about 150° C., evaporating the scrubbing oil and immediately quenching the unevaporated acetylene polymer residue after passing over the heated surface area at a temperature below the decomposition point of the polymers.

2. The process of claim 1, wherein high-boiling acetylene polymers are isolated from a contaminated scrubbing oil consisting of an aromatic hydrocarbon having a boiling point within the range of 170–220° C.

3. The process of claim 1 wherein hydrocarbon scrubbing oils are isolated by thin layer evaporation, unevaporated acetylene polymers being continuously removed from the heated surface area and quenched by cooling.

4. The process of claim 1 wherein the scrubbing oil consists essentially of aromatic hydrocarbons having a boiling range of about 170° to 230° C.

5. The process of claim 1 wherein the acetylene polymers have a boiling point of at least 200° C.

6. The process of claim 1 comprising allowing the scrubbing oil to flow over the heated surface area at a temperature of about 100°–150° C., under a pressure of about 30–100 mm. mercury.

7. The process of claim 1 wherein the heated surface area is heated to a temperature of about 100°–140° C.

8. The process of claim 1 wherein the acetylene polymer residue is immediately quenched at a temperature below about 80° C.

9. The process of claim 1 wherein the acetylene polymer is quenched by flowing over a cooled surface.

References Cited

UNITED STATES PATENTS 2,224,621   12/1940   Voorhees _____ 203—89

FOREIGN PATENTS 842,969   8/1960   Great Britain.

JOSEPH L. SCHOFER, *Primary Examiner.*

H. I. CANTOR, W. F. HAMROCK, *Assistant Examiners.*